US012636932B2

(12) United States Patent
Hirai

(10) Patent No.: US 12,636,932 B2
(45) Date of Patent: May 26, 2026

(54) TESTING SYSTEM, TESTING METHOD, AND PROGRAM RECORDING MEDIUM FOR TESTING SYSTEM

(71) Applicant: HORIBA, LTD., Kyoto (JP)

(72) Inventor: Seiji Hirai, Kyoto (JP)

(73) Assignee: HORIBA, LTD. (JP)

( * ) Notice: Subject to any disclaimer, the term of this patent is extended or adjusted under 35 U.S.C. 154(b) by 378 days.

(21) Appl. No.: 18/578,269

(22) PCT Filed: Jul. 5, 2022

(86) PCT No.: PCT/JP2022/026669
§ 371 (c)(1),
(2) Date: Jan. 10, 2024

(87) PCT Pub. No.: WO2023/286656
PCT Pub. Date: Jan. 19, 2023

(65) Prior Publication Data
US 2026/0116144 A1 Apr. 30, 2026

(30) Foreign Application Priority Data
Jul. 12, 2021 (JP) ................................. 2021-114788

(51) Int. Cl.
*B60H 1/00* (2006.01)
(52) U.S. Cl.
CPC ................................. *B60H 1/00585* (2013.01)
(58) Field of Classification Search
CPC ................................................. B60H 1/00585
See application file for complete search history.

(56) References Cited

U.S. PATENT DOCUMENTS

2002/0125334 A1* 9/2002 Remond .............. B60H 1/0073
165/203
2011/0307131 A1 12/2011 Norden
(Continued)

FOREIGN PATENT DOCUMENTS

JP 2004227937 A 8/2004
JP 2012514556 A 6/2012
(Continued)

OTHER PUBLICATIONS

EESR dated Jul. 3, 2025 issued in EP patent application No. 22842000.6.
(Continued)

*Primary Examiner* — David J Bolduc
(74) *Attorney, Agent, or Firm* — Brooks Kushman P.C.

(57) ABSTRACT

A testing system is for testing a thermal management system that is mounted on a vehicle and manages heat generated from one or a plurality of heat source components of the vehicle, and the testing system includes a simulated vehicle body that simulates a vehicle body of the vehicle, a simulated heat source body that thermally simulates the one or plurality of heat source components, a heat supply device that supplies heat to the simulated heat source body, a heat amount calculation unit that calculates a heat amount of heat generated from the one or plurality of heat source components of the vehicle during driving, and a heat source body control unit that controls the heat supply device based on the calculated heat amount to cause the simulated heat source body to thermally simulate the one or plurality of heat source components.

10 Claims, 4 Drawing Sheets

(56)               References Cited

U.S. PATENT DOCUMENTS

| | | | | |
|---|---|---|---|---|
| 2017/0144505 A1* | 5/2017 | Markowitz | ........ | B60H 1/00735 |
| 2019/0039437 A1* | 2/2019 | Jentz | ..................... | B60H 1/025 |

FOREIGN PATENT DOCUMENTS

| | | | |
|---|---|---|---|
| JP | 2019190711 | A | 10/2019 |
| JP | 6640905 | B | 2/2020 |

OTHER PUBLICATIONS

International Search Report dated Aug. 16, 2022 issued in International application No. PCT/JP2022/026669.

* cited by examiner

TESTING SYSTEM, TESTING METHOD, AND PROGRAM RECORDING MEDIUM FOR TESTING SYSTEM

CROSS-REFERENCE TO RELATED APPLICATIONS

This application is the U.S. national phase of PCT Application No. PCT/JP2022/026669, filed Jul. 5, 2022, which claims priority to Japanese Patent Application No. 2021-114788, filed Jul. 12, 2021, the disclosures of which are incorporated in their entirety by reference herein.

TECHNICAL FIELD

The present invention relates to a testing system for testing a thermal management system to be mounted on a vehicle, a testing method, and a program recording medium for a testing system.

BACKGROUND ART

In recent years, for example, with respect to a motorized vehicle such as a hybrid (including a plug-in hybrid) vehicle, an electric vehicle, or a fuel cell vehicle, development of a thermal management system that manages heat generated from a heat-generating component such as an engine, a battery, a motor, or an inverter has attracted attention from the viewpoints of improvement in cruising distance, improvement in passenger comfort, extension of battery life, and the like (for example, Patent Literature 1).

In a conventionally known method for evaluating performance of the thermal management system management system, the evaluation is done while causing a completed vehicle to perform simulation driving by using a chassis dynamometer.

CITATION LIST

Patent Literature

Patent Literature 1: JP 2012-514556 A

SUMMARY OF INVENTION

Technical Problem

However, in the conventional method described above, it is necessary to wait until a prototype vehicle is completed, to evaluate the performance of a developed thermal management system, which is a cause for an increase in a vehicle development time. Therefore, in order to shorten the vehicle development time, it is required to develop an unprecedented new type of testing system that can evaluate the thermal management system by simulation at the time when there is no prototype vehicle yet.

The present invention has been made in view of the above problem, and a main object of the present invention is to provide a testing system capable of testing a thermal management system to be mounted on a vehicle by simulation.

Solution to Problem

That is, a testing system according to the present invention is a testing system for testing a thermal management system that manages heat generated from one or a plurality of heat source components of a vehicle, and the testing system includes: a simulated vehicle body that simulates a vehicle body of the vehicle; a simulated heat source body that is installed in the simulated vehicle body and thermally simulates the one or plurality of heat source components; a heat supply device that supplies heat to the simulated heat source body; a heat amount calculation unit that calculates a heat amount of heat generated from the one or plurality of heat source components of the vehicle during driving, based on a vehicle model that models the vehicle; and a heat source body control unit that controls the heat supply device based on the calculated heat amount to cause the simulated heat source body to thermally simulate the one or plurality of heat source components.

With the configuration as described above, by installing, in the simulated vehicle body, the simulated heat source body that thermally simulates a heat source component and by controlling the simulated heat source body, it is possible to simulatively reproduce, in the simulated vehicle body, the heat generated from the heat source component of the vehicle during real road driving. Therefore, it is possible to test the thermal management system by simulation without performing simulation driving by using a completed vehicle. As a result, the thermal management system can be evaluated at the time when there is no prototype vehicle yet, and the development time of the vehicle can be shortened. In addition, since an evaluation test of the thermal management system can be performed by simulating the surrounding environment of the vehicle before completion of a prototype vehicle, it is also possible to shorten the test time after a real vehicle is completed. Furthermore, it is possible to perform efficiency evaluation of the thermal management system in the state of system, and the amount of electricity consumed as the system can be measured and can be used as basic data at the time when the specifications of the vehicle are fixed. Furthermore, since a driving state can be simulated without performing real road driving, it is possible to safely check, in a testing room, durability and reliability of the components and the system and reproducibility of occurrence of a failure. Furthermore, a component manufacturer of the thermal management system can evaluate the system by simulating components other than its own products. Note that the expression "supplies heat to the simulated heat source body" means "supplying the simulated heat source body with a thermal medium (heating medium or cooling medium) to heat or cool the simulated heat source body".

It is preferable that the testing system further include a plurality of the simulated heat source bodies, the heat amount calculation unit calculate a heat amount of heat generated from each of the plurality of heat source components, and the heat source body control unit control the heat supply device, based on the calculated heat amount of the each of the heat source components and cause the plurality of simulated heat source bodies to thermally simulate respective ones of the plurality of heat source components.

With this configuration, by simulatively reproducing the heat of the plurality of heat source components, it is possible to more faithfully reproduce, in the simulated vehicle body, the heat generated from the vehicle during real driving.

It is preferable that the testing system further include: a simulated vehicle body air conditioning device that supplies temperature-controlled air into the simulated vehicle body; and a driving environment control unit that controls the simulated vehicle body air conditioning device based on a driving environment model modeling a driving environment of the vehicle during driving and that causes the simulated vehicle body to simulatively reproduce the driving environment of the vehicle during driving.

With this configuration, since it is possible to simulatively reproduce, in the simulated vehicle body, the driving environment such as temperature and humidity of air outside the vehicle during real driving, it is possible to more faithfully reproduce the environment in which the thermal management system is placed during real driving.

It is preferable that the testing system further include: a simulated vehicle cabin used to thermally simulate an environment of a vehicle cabin of the vehicle; a simulated vehicle cabin air conditioning device that supplies temperature-controlled air into the simulated vehicle cabin; and a vehicle cabin environment control unit that controls the simulated vehicle cabin air conditioning device based on a vehicle cabin environment model modeling the environment of the vehicle cabin during driving and that causes the simulated vehicle cabin to simulatively reproduce the environment of the vehicle cabin during driving.

With this configuration, since it is possible to simulatively reproduce, in the simulated vehicle body, the driving environment such as temperature and humidity of air inside the vehicle cabin during real driving, it is possible to more faithfully reproduce the environment in which the thermal management system is placed during real driving.

It is preferable that the testing system further include an operation state acquisition unit that acquires an operation state of the thermal management system.

With this configuration, it is possible to automatically acquire, during testing, the operation state and the like such as power consumption of the thermal management system such as a temperature control system.

Specific aspects of the testing system include the testing system in which the vehicle is a motorized vehicle, and the operation state acquisition unit acquires information on power consumption of the thermal management system as the operation state.

Specific aspects of the testing system include the testing system in which the thermal management system includes a temperature control device that adjusts heat generated from the vehicle, and the temperature control device includes one or more selected from a heating, ventilation, and air conditioning (HVAC), an intercooler, a compressor, a radiator, or a heater.

Specific aspects of the testing system include the testing system in which the simulated heat source body thermally simulates one or more selected from an engine, a motor, an inverter, or a battery of the vehicle.

A testing method of the present invention is a testing method for testing a thermal management system that manages heat generated from one or a plurality of heat source components of a vehicle, and the testing method uses a testing system including: a simulated vehicle body that simulates a vehicle body of the vehicle; a simulated heat source body that is installed in the simulated vehicle body and thermally simulates the one or plurality of heat source components; and a heat supply device that supplies heat to the simulated heat source body. The testing method includes: a heat amount calculation step for calculating a heat amount of heat generated from the one or plurality of heat source components of the vehicle during driving, based on a vehicle model that models the vehicle; and a simulated heat source body control step for controlling the heat supply device based on the calculated heat amount to cause the simulated heat source body to thermally simulate the one or plurality of heat source components.

A program recording medium for a testing system of the present invention is a recording medium storing a program for a testing system for testing a thermal management system that manages heat generated from one or a plurality of heat source components of a vehicle, the testing system including: a simulated vehicle body that simulates a vehicle body of the vehicle; a simulated heat source body that is installed in the simulated vehicle body and thermally simulates the one or plurality of heat source components; and a heat supply device that supplies heat to the simulated heat source body. The program causes a computer to execute functions as: a heat amount calculation unit that calculates a heat amount of heat generated from the one or plurality of heat source components of the vehicle during driving, based on a vehicle model that models the vehicle; and a heat source body control unit that controls the heat supply device based on the calculated heat amount to cause the simulated heat source body to thermally simulate the one or plurality of heat source components.

The testing method and the program recording medium for a testing system as described above can provide the same action and effect as those of the testing system of the present invention.

Advantageous Effects of Invention

The present invention configured as described above can provide a testing system capable of testing a thermal management system to be mounted on a vehicle, by simulation.

DESCRIPTION OF EMBODIMENTS

Hereinafter, a testing system 100 according to an embodiment of the present invention will be described with reference to the drawings.

<Configuration of Testing System 100>

The testing system 100 of the present embodiment tests, by simulation, an operation of a thermal management system 200 that is to be mounted on a motorized vehicle such as a hybrid vehicle (including a plug-in hybrid vehicle), an electric vehicle, or a fuel cell vehicle and that manages heat generated from one or a plurality of heat source components (for example, an engine, a motor, an inverter, or a battery).

Specifically, the testing system 100 simulatively reproduces heat generated from a heat source component of a vehicle during real road driving, in a simulated vehicle body 1 in which the thermal management system 200, which is a product under test, is installed, and acquires and evaluates an operation state of the thermal management system 200.

Figure 1:
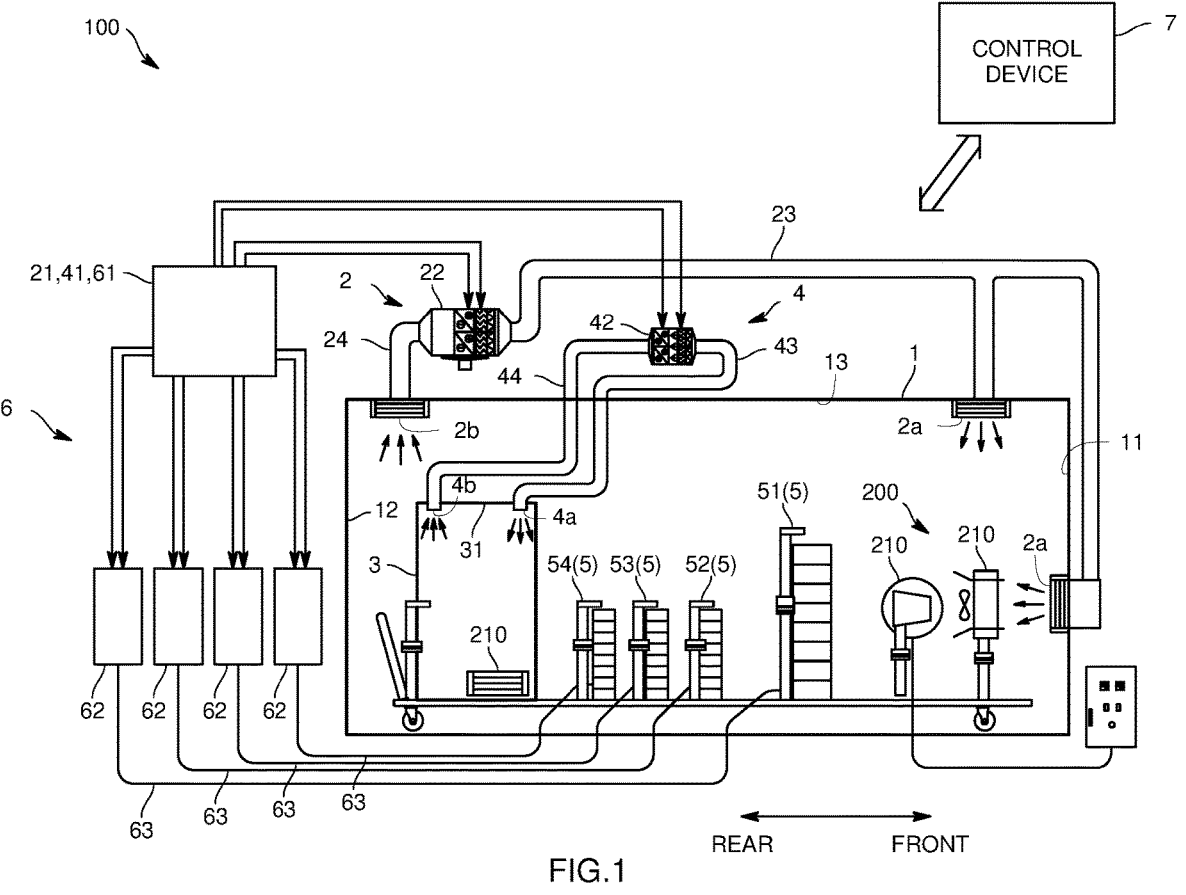
FIG. 1 is a diagram schematically illustrating an overall configuration of a testing system in the present embodiment.

More specifically, as illustrated in FIG. 1, the testing system 100 includes: a simulated vehicle body 1 in which the thermal management system 200, which is a product under test, is installed; a simulated vehicle body air conditioning device 2 that adjusts air in the simulated vehicle body 1; a simulated vehicle cabin 3 that simulates a vehicle cabin of a vehicle; a simulated vehicle cabin air conditioning device 4 that adjusts air in the simulated vehicle cabin 3; simulated heat source bodies 5 housed in the simulated vehicle body 1 together with the thermal management system 200; a heat supply device 6 that supplies heat to the simulated heat source bodies 5; and a control device 7.

The simulated vehicle body 1 thermally simulates a vehicle body of a vehicle and is specifically for simulatively reproducing a driving environment of the vehicle during real road driving (meaning a state where power is on, and including an idling state and the like). The driving environment is an environment of air outside the vehicle (that is, the air taken into the engine room) during real road driving.

Specifically, this driving environment includes at least the temperature of the air outside the vehicle during real road driving, and may include humidity, pressure, air volume, or the like.

Specifically, the simulated vehicle body 1 has, for example, a rectangular parallelepiped shape having excellent heat insulating properties, and inside the simulated vehicle body 1 there is formed a housing space to house the thermal management system 200 and the simulated heat source bodies 5. Regarding the simulated vehicle body 1, a front-rear direction thereof is set corresponding to the front-rear direction of the vehicle. The air in the simulated vehicle body 1 is adjusted by the simulated vehicle body air conditioning device 2 so as to have at least a predetermined temperature, preferably a predetermined temperature and humidity.

The simulated vehicle body air conditioning device 2 receives a control signal from the control device 7 and adjusts the air in the simulated vehicle body 1 to a predetermined temperature, thereby simulatively reproducing the driving environment of the vehicle during real road driving, by the space in the simulated vehicle body 1.

More specifically, the simulated vehicle body air conditioning device 2 is configured to circulate the air between itself and the simulated vehicle body 1, and includes: a heat source device 21 (for example, a hot heat source device or a cold heat source device such as a boiler or a refrigerator) that transfers heat to and from a heat transfer medium; a simulated vehicle body air conditioner 22 (for example, a fan coil unit or an air handling unit) that adjusts air to a desired temperature by exchanging heat with the heat transfer medium (for example, a cooling medium or a heating medium such as cold water or hot water) sent from the heat source device 21; an air supply duct 23 that sends air from the simulated vehicle body air conditioner 22 to the simulated vehicle body 1; and an air return duct 24 that returns air from the simulated vehicle body 1 to the simulated vehicle body air conditioner 22. The simulated vehicle body air conditioner 22 may include a humidifying device and/or a dehumidifying device so that the air can be adjusted to a desired humidity. Note that the heat source device 21 and the simulated vehicle body air conditioner 22 are disposed outside the simulated vehicle body 1.

At downstream ends of the air supply duct 23, there are provided blow-out ports 2a through which air whose temperature and the like are adjusted is blown out into the simulated vehicle body 1. The air supply duct 23 of the present embodiment is branched at the middle and is thus provided with a plurality of blow-out ports 2a at its downstream ends. In addition, at an upstream end of the air return duct 24, there is provided a suction port 2b for sucking air in the simulated vehicle body 1.

In the present embodiment, the wind hitting the vehicle during driving is simulated, and the positions of the blow-out ports 2a and the suction port 2b are set such that the air flows from the front toward the rear in the simulated vehicle body 1.

Specifically, the plurality of blow-out ports 2a are provided to be opened in respective ones of a front wall 11 and a ceiling 13 of the simulated vehicle body 1, and the suction port 2b is provided to be opened rearward of the blow-out ports 2a in the ceiling 13 of the simulated vehicle body 1. The blow-out port 2a provided in the ceiling 13 is preferably provided forward of at least the simulated heat source bodies 5 housed in the simulated vehicle body 1. Further, the suction port 2b provided in the ceiling 13 is preferably provided rearward of at least the simulated heat source bodies 5 housed in the simulated vehicle body 1.

The simulated vehicle cabin 3 is for simulatively reproducing the vehicle cabin environment of the vehicle during real road driving. The vehicle cabin environment is, for example, an air environment in the vehicle cabin. Specifically, the vehicle cabin environment includes at least temperature of the air in the vehicle cabin, and may include humidity, pressure, air volume, wind direction, or the like.

Specifically, the simulated vehicle cabin 3 is constituted by, for example, a housing having a rectangular parallelepiped shape and excellent heat insulation performance, and is provided rearward of (on the leeward side of) the simulated heat source bodies 5 in the simulated vehicle body 1. The air in the vehicle cabin is adjusted to have at least a predetermined temperature and, preferably, to have a predetermined temperature and humidity, by the simulated vehicle cabin air conditioning device 4.

The simulated vehicle cabin air conditioning device 4 receives a control signal from the control device 7 and adjusts the air in the simulated vehicle cabin 3 to a predetermined temperature (preferably, to a predetermined temperature and humidity), thereby causing the simulated vehicle cabin 3 to simulatively reproduce the vehicle cabin environment during real road driving. More specifically, the simulated vehicle cabin air conditioning device 4 is configured to circulate the air between itself and the simulated vehicle cabin 3, and includes: a heat source device 41 (for example, a hot heat source device or a cold heat source device such as a boiler or a refrigerator) that transfers heat to and from a heat transfer medium; a simulated vehicle cabin air conditioner 42 (for example, a fan coil unit or an air handling unit) that adjusts air to a desired temperature by exchanging heat with the heat transfer medium (for example, a cooling medium or a heating medium such as cold water or hot water) sent from the heat source device 41; an air supply duct 43 that sends air from the simulated vehicle cabin air conditioner 42 to the simulated vehicle cabin 3; and an air return duct 44 that returns air from the simulated vehicle cabin 3 to the simulated vehicle cabin air conditioner 42. The simulated vehicle cabin air conditioner 42 may include a humidifying device and/or a dehumidifying device so that the air can be adjusted to a desired humidity. Note that the heat source device 41 and the simulated vehicle cabin air conditioner 42 are disposed outside the simulated vehicle body 1.

At downstream end of the air supply duct 43, there is provided a blow-out port 4a through which air whose temperature and the like have been adjusted is blown out into the simulated vehicle cabin 3. In addition, at an upstream end of the air return duct 44, there is provided a suction port 4b for sucking air in the simulated vehicle cabin 3. The blow-out port 4a and the suction port 4b of the present embodiment are each provided to be opened on the ceiling 31 of the simulated vehicle cabin 3.

The simulated heat source bodies 5 are for thermally simulating the heat source components included in the vehicle. The simulated heat source bodies 5 may be anything as long as they can generate at least heat in the simulated vehicle body 1.

The simulated heat source bodies 5 of the embodiment are, for example, heat radiation devices or heat exchangers, and are configured to radiate heat supplied from the heat supply device 6 into the simulated vehicle body 1, by heat conduction. In the embodiment, a heating fluid such as hot water at a predetermined temperature and flow rate is supplied from the heat supply device 6, so that heat is generated in the simulated vehicle body 1.

The testing system 100 of the present embodiment includes one or a plurality of simulated heat source bodies 5 corresponding to respective ones of a plurality of heat source components so that the heat generated from the heat source components can be simulatively reproduced. Specifically, the testing system 100 includes, as the simulated heat source body 5, at least one of the followings: a simulated engine 51 that thermally simulates an engine; a simulated motor 52 that thermally simulates a motor; a simulated inverter 53 that thermally simulates an inverter; and a simulated battery 54 that thermally simulates a battery. The plurality of simulated heat source bodies 5 are disposed between the blow-out ports 2a and the suction port 2b (in addition, forward of the simulated vehicle cabin 3) in the simulated vehicle body 1, for example, in order along the front-rear direction.

The heat supply device 6 receives a control signal from the control device 7 and supplies heat of a predetermined heat amount to the simulated heat source bodies 5, thereby thermally simulating the heat source bodies during real road driving, in the simulated vehicle body 1. More specifically, the heat supply device 6 includes: a heat source device 61 (for example, a hot heat source device or a cold heat source device such as a boiler or a refrigerator) that transfers heat to and from a heat transfer medium; a temperature control device 62 that generates a heating fluid having a desired temperature (for example, −20° C. to 110° C.) by heat exchange or the like using the heat transfer medium (for example, a cooling medium or a heating medium such as cold water or hot water) sent from the heat source device 61; and a pipe 63 that allows the heating fluid to flow between the temperature control device 62 and the simulated heat source body 5. The temperature control device 62 is configured to perform flow rate control and differential pressure control so as to supply a heating fluid of a desired flow rate to the simulated heat source body 5. Note that the heat source device 61 and the temperature control device 62 are disposed outside the simulated vehicle body 1. The testing system 100 of the present embodiment includes a plurality of the heat supply devices 6 corresponding to respective ones of the plurality of simulated heat source bodies 5.

As illustrated in FIG. 1, the single heat source device 61 is shared among the plurality of heat supply devices 6. In addition, a single heat source device is shared also among the simulated vehicle body air conditioning device 2, the simulated vehicle cabin air conditioning device 4, and the plurality of heat supply devices 6.

The thermal management system 200, which is a product under test, is installed in the simulated vehicle body 1 configured as described above. The thermal management system 200 includes: temperature control devices 210 for heating or cooling heat source components of a vehicle to adjust heat generated from the heat source components; and a temperature control device controller (not illustrated) for controlling operations of the temperature control devices 210. Note that the temperature control device controller is not necessarily installed in the simulated vehicle body 1, and may be installed outside the simulated vehicle body 1.

The temperature control devices 210 are, for example, a heating, ventilation, and air conditioning (HVAC), an inter-cooler, a compressor, a radiator, or a heater. The testing system 100 of the present embodiment is configured to test the operations of the radiator, the compressor, and the HVAC, which function as the temperature control devices 210, and actual machines of these temperature control devices 210 are disposed in the simulated vehicle body 1. Each temperature control device 210 is disposed at a position thermally simulating the vehicle during real road driving, in the simulated vehicle body 1. Specifically, the radiator and the compressor are disposed forward of the simulated heat source bodies 5 in the simulated vehicle body 1 and at positions facing the blow-out port 2a provided in the front wall 11 of the simulated vehicle body 1 (that is, positions on which the temperature-controlled air blows from the front).

Further, the HVAC is disposed in the simulated vehicle cabin 3 to thermally simulate an actual vehicle.

Figure 2:
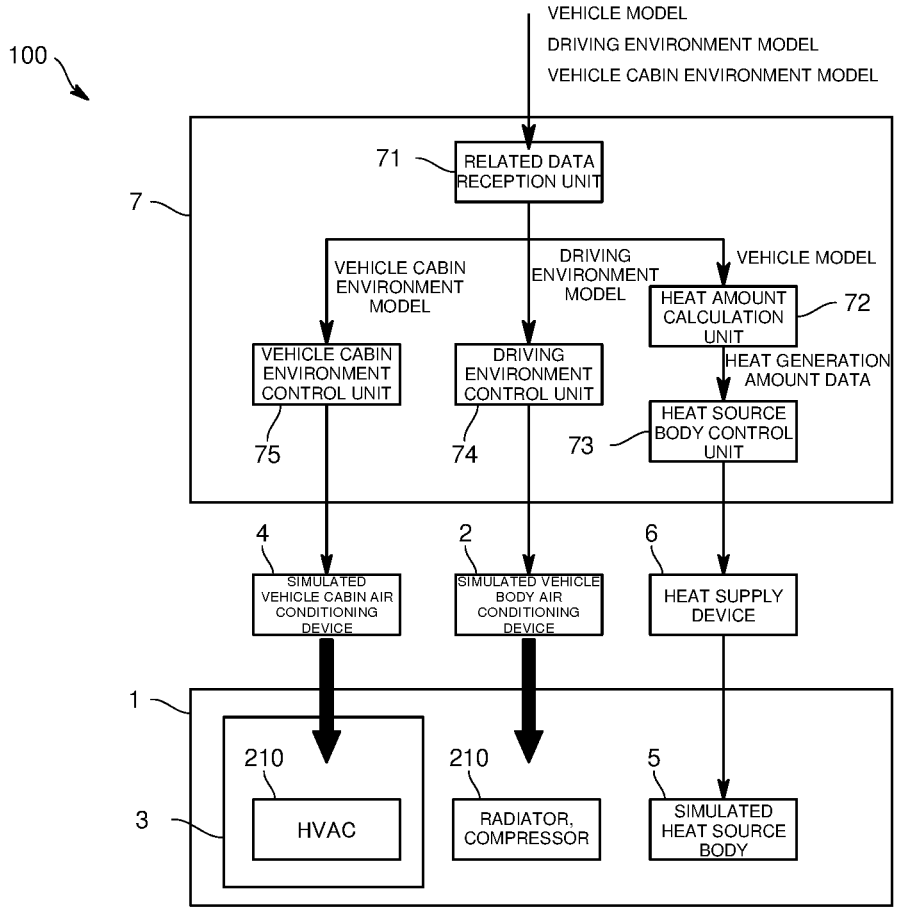
FIG. 2 is a functional block diagram of the testing system in the embodiment.

The control device 7 causes the simulated heat source bodies 5 to reproduce, in the simulated vehicle body 1, at least heat generated from the heat source components when the vehicle drives on a real road. The control device 7 of the present embodiment is configured to thermally simulate and reproduce, in the simulated vehicle body 1, an environment of the vehicle during real road driving by controlling the simulated vehicle body air conditioning device 2, the simulated vehicle cabin air conditioning device 4, and the heat supply device 6. Specifically, the control device 7 is a dedicated or general-purpose computer including a central processing unit (CPU), an internal memory, an input/output interface, an analog-digital (A/D) converter, and the like. The CPU and the peripheral devices cooperate with each other on the basis of a predetermined program stored in the internal memory, so that the control device 7 executes, at least, functions as a related data reception unit 71, a heat amount calculation unit 72, a heat source body control unit 73, a driving environment control unit 74, and a vehicle cabin environment control unit 75, as illustrated in FIG. 2.

The related data reception unit 71 receives at least one of a vehicle model that models a vehicle, a driving environment model that models a driving environment, or a vehicle cabin environment model that models a vehicle cabin environment, and outputs the received at least one model to the heat amount calculation unit 72, the driving environment control unit 74, and/or the vehicle cabin environment control unit 75.

The vehicle model, the driving environment model, or the vehicle cabin environment model is appropriately input by a user of the testing system 100.

The vehicle model includes a plurality of heat source component models in which various parameters of a plurality of heat source components included in at least the vehicle are quantified. The vehicle model of the present embodiment includes, as the heat source component model, at least one of the followings: an engine model in which an amount of heat generated from the engine is quantified; a motor model in which an amount of heat generated from the motor is quantified; an inverter model in which an amount of heat generated from the inverter is quantified; and a battery model in which an amount of heat generated from the battery is quantified. Furthermore, the vehicle model may be a model that models the following vehicle information: a type of an actual vehicle (such as truck or passenger vehicle), a weight, a transmission type (such as manual transmission (MT), automatic transmission (AT), or continuously variable transmission (CVT)), a tire diameter, a transmission gear ratio, engine characteristics (such as the relationship of an output torque with respect to a throttle opening degree and a rotation speed), control characteristics of an ECU (such as the relationship between an accelerator opening degree and a throttle opening degree), control characteristics of a transmission control unit (TCU) (such as a condition for changing a transmission gear ratio and the timing for the changing)), or control characteristics of a brake control unit (BCU) (such as distribution of a braking force to each wheel).

The driving environment model is a model in which various parameters representing the driving environment of the vehicle during real road driving are quantified. The various parameters representing the driving environment include at least the temperature of the air outside the vehicle during real road driving, and may include humidity, pressure, air volume, or the like.

The vehicle cabin environment model is a model in which various parameters representing the vehicle cabin environment during real road driving are quantified.

The various parameters representing the vehicle cabin environment include at least the temperature of the air inside the vehicle cabin during real road driving, and may include humidity, pressure, air volume, or the like.

The heat amount calculation unit 72 is configured to calculate, on the basis of the vehicle model acquired by the related data reception unit 71, an amount of heat generated from each heat source component of the actual vehicle when the actual vehicle performs real road driving according to a predetermined driving scenario, and outputs the calculated amount of heat as heat generation amount data. The heat generation amount data represents, for example, a relationship between an elapsed time from the start of driving and the amount of heat generated from each heat source component.

The heat source body control unit 73 controls the plurality of heat supply devices 6 on the basis of the heat generation amount, of each heat source component, represented by the heat generation amount data, and causes the heat supply devices 6 to supply heat of such heat generation amount to each simulated heat source body 5, thereby causing the simulated heat source bodies 5 to thermally simulate respective ones of the heat source components. Specifically, the heat source body control unit 73 controls the heat source device 61 and the temperature control devices 62 included in the heat supply devices 6 on the basis of the heat generation amount, of each heat source component, represented by the heat generation amount data, and causes the heat source device 61 and the temperature control devices 62 to supply heating fluids at predetermined temperatures and flow rates to the simulated heat source bodies 5.

The driving environment control unit 74 further controls the simulated vehicle body air conditioning device 2 on the basis of the driving environment model, thereby causing the simulated vehicle body 1 to simulatively reproduce the driving environment of the vehicle during driving. Specifically, the driving environment control unit 74 controls and causes the simulated vehicle body air conditioning device 2 to blow out the air at the temperature represented by the driving environment model from the blow-out ports 2a toward the inside of the simulated vehicle body 1. Furthermore, in addition to the adjustment of the temperature, the driving environment control unit 74 may control and cause the simulated vehicle body air conditioning device 2 to blow out the air that is adjusted to the humidity, the pressure, or the air volume represented by the driving environment model.

Furthermore, the vehicle cabin environment control unit 75 further controls the simulated vehicle cabin air conditioning device 4 on the basis of the vehicle cabin environment model, thereby causing the simulated vehicle cabin 3 to simulatively reproduce the vehicle cabin environment during driving. Specifically, the vehicle cabin environment control unit 75 controls and causes the simulated vehicle cabin air conditioning device 4 to blow out the air at the temperature represented by the vehicle cabin environment model from the blow-out ports toward the inside of the vehicle cabin. Furthermore, in addition to the adjustment of the temperature, the vehicle cabin environment control unit 75 may control and cause the simulated vehicle cabin air conditioning device 4 to blow out the air that is adjusted to the humidity, the pressure, or the air volume represented by the vehicle cabin environment model.

Furthermore, the driving environment control unit 74 is configured to calculate the amount of heat (heat radiation amount) radiated from the devices housed in the simulated vehicle body 1, on the basis of a control amount of the simulated vehicle body air conditioning device 2. Furthermore, the vehicle cabin environment control unit 75 is configured to calculate the amount of heat (heat radiation amount) radiated from the devices housed in the vehicle cabin, on the basis of a control amount of the simulated vehicle cabin air conditioning device 4.

With the testing system 100 of the present embodiment as configured above, by installing, in the simulated vehicle body 1, the simulated heat source bodies 5 that thermally simulate the heat source components and by controlling the simulated heat source bodies 5, it is possible to simulatively reproduce, in the simulated vehicle body 1, the heat generated from the heat source components of the vehicle during real road driving. Therefore, it is possible to test the thermal management system 200 by simulation without using a completed vehicle to perform simulation driving. As a result, the thermal management system 200 can be evaluated at the time when there is no prototype vehicle yet, and the development time of the vehicle can be shortened. In addition, since an evaluation test of the thermal management system can be performed by simulating the surrounding environment of the vehicle before completion of a prototype vehicle, it is also possible to shorten the test time after a real vehicle is completed. Furthermore, it is possible to perform efficiency evaluation of the thermal management system 200 as a completed system, and the amount of electricity consumed as the system can be measured and can be used as basic data for the time when the specifications of the vehicle is fixed. Furthermore, since a driving state can be simulated without performing real road driving, it is possible to safely check, in the simulated vehicle body 1, durability and reliability of the components and the system and reproducibility of occurrence of a failure. Furthermore, in a component manufacturer of the thermal management system 200, it is possible to evaluate the system by simulating components other than its own products.

Note that the present invention is not limited to the above embodiment.

For example, the testing system 100 of the above embodiment tests the thermal management system 200 to be mounted on a motorized vehicle, but the present invention is not limited thereto. In other embodiments, the thermal management system 200 to be mounted on a pure engine vehicle may be tested.

In the above embodiment, the control device 7 executes all the functions of the following units: the related data reception unit 71; the heat amount calculation unit 72; the heat source body control unit 73; the driving environment control unit 74; and the vehicle cabin environment control unit 75, but the present invention is not limited such a configuration. Some of these functions may be executed by another computer.

Figure 3:
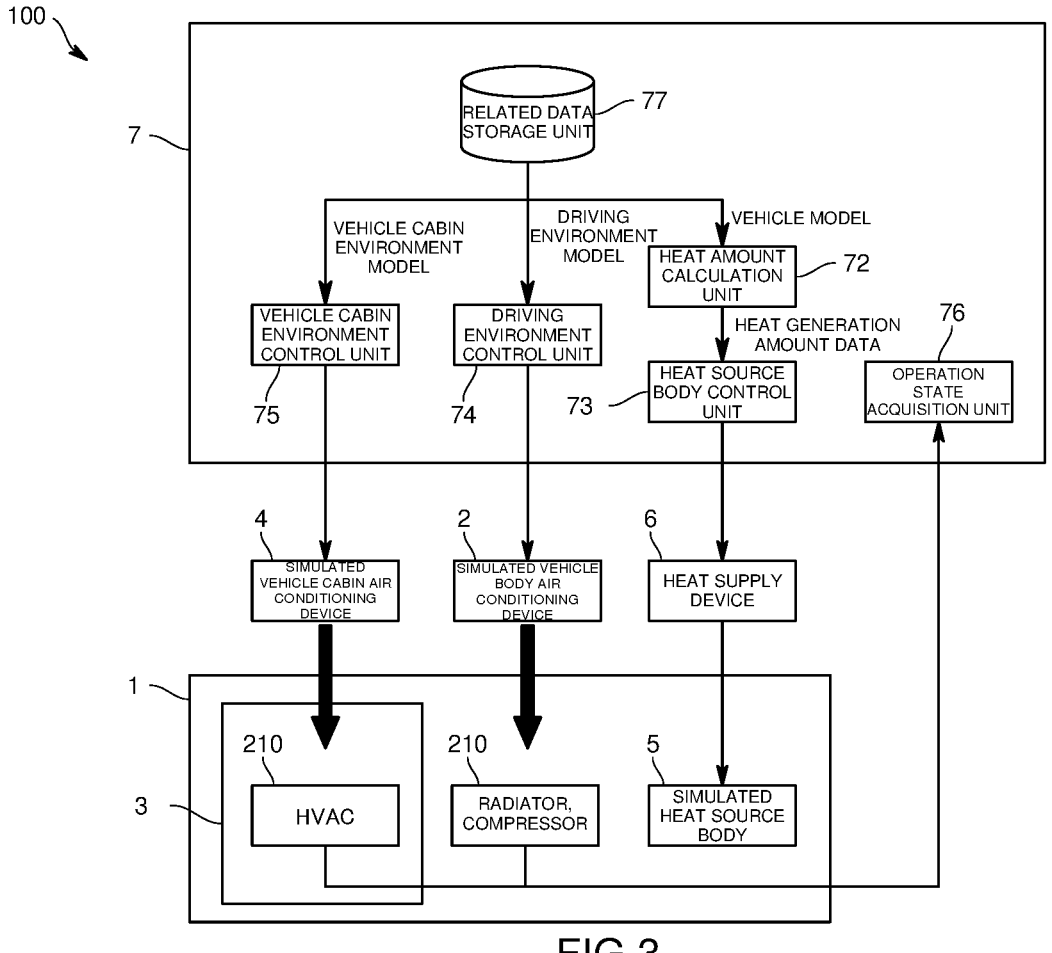
FIG. 3 is a functional block diagram of a testing system in another embodiment.

In the testing system 100 according to another embodiment, as illustrated in FIG. 3, the control device 7 may be configured to function as an operation state acquisition unit 76. The operation state acquisition unit 76 acquires the operation state of the thermal management system 200 during the test of the thermal management system 200. The operation state is, for example, power consumption of each temperature control device 210 included in the thermal management system 200. The operation state acquisition unit 76 acquires operation state data indicating the operation state of each temperature control device 210 from a control device of the thermal management system 200 during the test of the thermal management system 200. Note that the function as the operation state acquisition unit 76 may be executed by another computer.

In the testing system 100 according to another embodiment, as illustrated in FIG. 3, the control device 7 may be configured to execute a function as a related data storage unit 77. The related data storage unit 77 is set in a predetermined area of the memory and previously stores at least one of a vehicle model that models a vehicle, a driving environment model that models a driving environment, or a vehicle cabin environment model that models a vehicle cabin environment. Then, at least one of the heat amount calculation unit 72, the driving environment control unit 74, or the vehicle cabin environment control unit 75 may be configured to acquire each model with reference to the related data storage unit 77.

In the above embodiment, the simulated vehicle body air conditioning device 2 is configured to set the air in the simulated vehicle body 1 to at least a predetermined temperature, but the present invention is not limited thereto. The simulated vehicle body air conditioning device 2 of another embodiment may be configured to set the air in the simulated vehicle body 1 to at least a predetermined humidity. Similarly, the simulated vehicle cabin air conditioning device 4 of another embodiment may be configured to set the air in the simulated vehicle cabin 3 to at least a predetermined humidity.

In the above embodiment, a single heat source device 61 is shared among the plurality of heat supply devices 6, and, in addition, a single heat source device is shared among the simulated vehicle body air conditioning device 2, the simulated vehicle cabin air conditioning device 4, and the heat supply devices 6, but the present invention is not limited thereto. Each heat supply device 6 may individually include a heat source device 61. The simulated vehicle body air conditioning device 2, the simulated vehicle cabin air conditioning device 4, and the heat supply device 6 may individually include a heat source device.

In the above embodiment, the heat supply device 6 is configured to generate a heating fluid by the temperature control device 62 and to supply the heating fluid to the simulated heat source body 5 to perform heating, but the present invention is not limited thereto. In another embodiment, the heat supply device 6 may be configured to generate a cooling fluid by the temperature control device 62, to supply the cooling fluid to the simulated heat source body 5 (simulated engine 51, simulated motor 52, simulated inverter 53, simulated battery 54, or the like), and to cool the simulated heat source body 5. The heat supply device 6 may be controlled by the heat source body control unit 73 and selectively generates a heating fluid or a cooling fluid and supply the heating fluid or the cooling fluid to the simulated heat source body 5.

Figure 4:
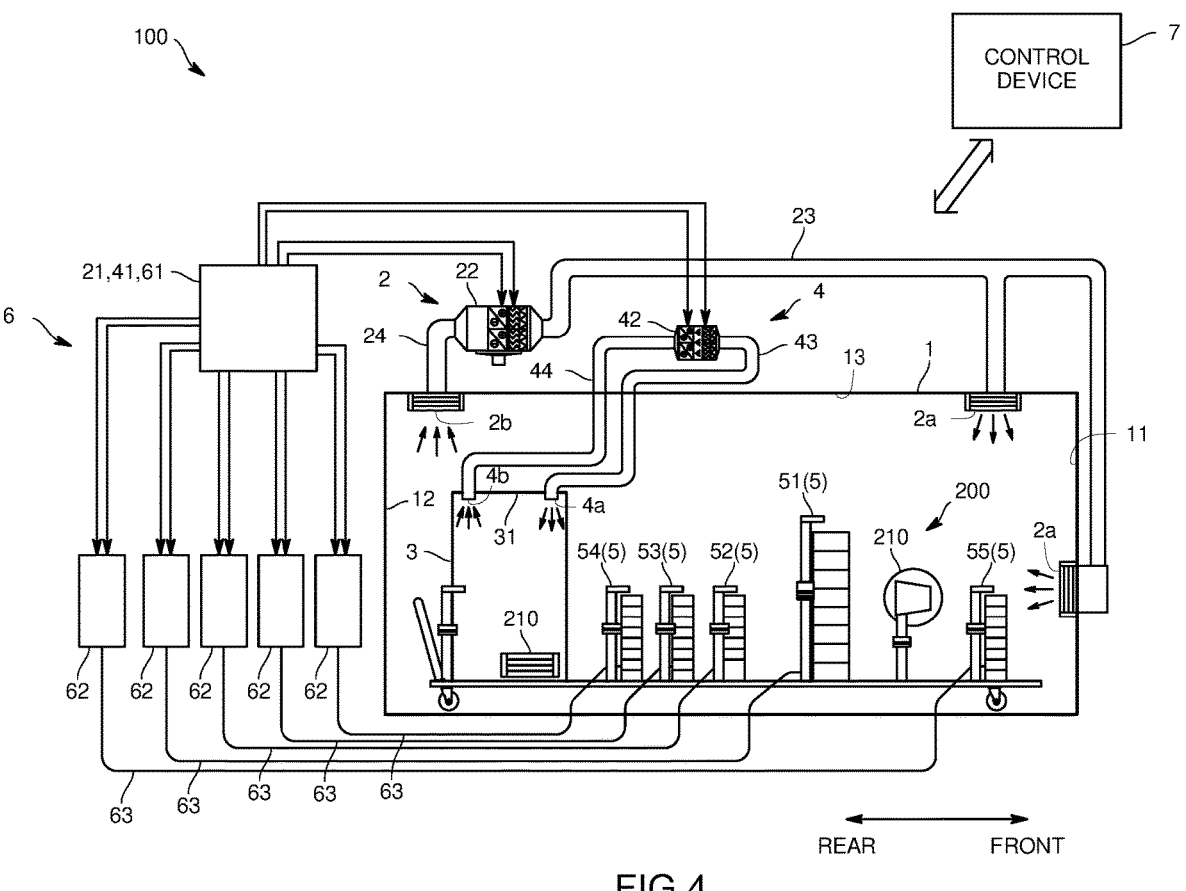
FIG. 4 is a diagram schematically illustrating an overall configuration of a testing system according to another embodiment.

In another embodiment, the simulated heat source body 5 may be for simulating some of the temperature control devices (specifically, an HVAC, an intercooler, a compressor, a radiator, a heater, or the like) constituting the thermal management system. For example, as illustrated in FIG. 4, the testing system 100 of another embodiment may further includes a simulated radiator 55 that simulates a radiator as the simulated heat source body 5. The heat supply device 6 may be configured to generate a heating fluid or a cooling fluid by the temperature control device 62 and to supply the heating fluid or the cooling fluid to the simulated radiator 55 to perform heating or cooling. Note that there may be further included a simulated heat source body 5 that simulates not only a radiator but also another temperature control device constituting the thermal management system such as an HVAC, an intercooler, a compressor, or a heater.

The type and the order of the simulated heat source bodies 5 disposed in the simulated vehicle body 1 are not limited to those in the above embodiment, and may be arbitrarily changed. Similarly, the type and the order of the thermal management systems 200 disposed in the simulated vehicle body 1 are not limited to those in the above embodiment, and may be arbitrarily changed.

The positions and the orientations of the blow-out ports 2a and the suction port 2b of the simulated vehicle body air conditioning device 2 and the blow-out port 4a and the suction port 4b of the simulated vehicle cabin air conditioning device 4 are not limited to those in the above embodiment, and may be arbitrarily changed. For example, the blow-out port 2a does not need to be provided in the ceiling 13 of the simulated vehicle body 1. The suction port 2b does not need to be provided rearward of the simulated heat source bodies 5. The blow-out port 4a and the suction port 4b do not need to be provided to be opened in the ceiling 31 of the simulated vehicle cabin 3.

Although the simulated vehicle body 1 and the simulated vehicle cabin 3 of the embodiment are configured to have a rectangular parallelepiped shape, the present invention is not limited thereto. The simulated vehicle body 1 and the simulated vehicle cabin 3 may have any shape as long as the simulated vehicle body 1 and the simulated vehicle cabin 3 form a space having excellent heat insulation performance.

In addition, the present invention is not limited to the above embodiments, and it goes without saying that various modifications can be made without departing from the gist of the present invention.

INDUSTRIAL APPLICABILITY

According to the present invention described above, it is possible to provide a testing system capable of testing a thermal management system to be mounted on a vehicle by simulation.

REFERENCE SIGNS LIST 100 testing system
1 simulated vehicle body
2 simulated vehicle body air conditioning device
4 simulated vehicle cabin air conditioning device
5 simulated heat source body 6 heat supply device
7 control device
72 heat amount calculation unit
73 heat source body control unit
200 thermal management system (product under test)

The invention claimed is:

1. A testing system for testing a thermal management system that manages heat generated from one or a plurality of heat source components of a vehicle, the testing system comprising:

a simulated vehicle body that simulates a vehicle body of the vehicle;

a simulated heat source body that is installed in the simulated vehicle body and thermally simulates the one or plurality of heat source components;

a heat supply device that supplies heat to the simulated heat source body;

a heat amount calculation unit that calculates a heat amount of heat generated from the one or plurality of heat source components of the vehicle during driving, based on a vehicle model that models the vehicle; and a heat source body control unit that controls the heat supply device based on the calculated heat amount to cause the simulated heat source body to thermally simulate the one or plurality of heat source components.

2. The testing system according to claim 1, further comprising a plurality of the simulated heat source bodies, wherein the heat amount calculation unit calculates a heat amount of heat generated from each of the plurality of heat source components, and the heat source body control unit controls the heat supply device, based on the calculated heat amount of the each of the heat source components and causes the plurality of simulated heat source bodies to thermally simulate respective ones of the plurality of heat source components.

3. The testing system according to claim 1, further comprising:

a simulated vehicle body air conditioning device that supplies temperature-controlled air into the simulated vehicle body; and a driving environment control unit that controls the simulated vehicle body air conditioning device based on a driving environment model modeling a driving environment of the vehicle during driving and that causes the simulated vehicle body to simulatively reproduce the driving environment of the vehicle during driving.

4. The testing system according to claim 1, further comprising:

a simulated vehicle cabin used to thermally simulate an environment of a vehicle cabin of the vehicle;

a simulated vehicle cabin air conditioning device that supplies temperature-controlled air into the simulated vehicle cabin; and a vehicle cabin environment control unit that controls the simulated vehicle cabin air conditioning device based on a vehicle cabin environment model modeling the environment of the vehicle cabin during driving and that causes the simulated vehicle cabin to simulatively reproduce the environment of the vehicle cabin during driving.

5. The testing system according to claim 1, further comprising an operation state acquisition unit that acquires an operation state of the thermal management system.

6. The testing system according to claim 5, wherein the vehicle is a motorized vehicle, and the operation state acquisition unit acquires information on power consumption of the thermal management system as the operation state.

7. The testing system according to claim 1, wherein the thermal management system includes a temperature control device that adjusts heat generated from the vehicle, and the temperature control device includes one or more selected from a heating, ventilation, and air conditioning (HVAC), an intercooler, a compressor, a radiator, or a heater.

8. The testing system according to claim 1, wherein the simulated heat source body thermally simulates one or more selected from an engine, a motor, an inverter, or a battery of the vehicle.

9. A testing method for testing a thermal management system that manages heat generated from one or a plurality of heat source components of a vehicle, the testing method using a testing system including: a simulated vehicle body that simulates a vehicle body of the vehicle; a simulated heat source body that is installed in the simulated vehicle body and thermally simulates the one or plurality of heat source components; and a heat supply device that supplies heat to the simulated heat source body, the testing method comprising:

a heat amount calculation step for calculating a heat amount of heat generated from the one or plurality of heat source components of the vehicle during driving, based on a vehicle model that models the vehicle; and a simulated heat source body control step for controlling the heat supply device based on the calculated heat amount to cause the simulated heat source body to thermally simulate the one or plurality of heat source components.

10. A recording medium storing a program for a testing system for testing a thermal management system that manages heat generated from one or a plurality of heat source components of a vehicle, the testing system including: a simulated vehicle body that simulates a vehicle body of the vehicle; a simulated heat source body that is installed in the simulated vehicle body and thermally simulates the one or plurality of heat source components; and a heat supply device that supplies heat to the simulated heat source body, the program causing a computer to execute functions as:

a heat amount calculation unit that calculates a heat amount of heat generated from the one or plurality of heat source components of the vehicle during driving, based on a vehicle model that models the vehicle; and a heat source body control unit that controls the heat supply device based on the calculated heat amount to cause the simulated heat source body to thermally simulate the one or plurality of heat source components.

* * * * *